United States Patent Office 3,546,186
Patented Dec. 8, 1970

3,546,186
COPOLYMERS OF SUBSTITUTED PERFLUOROVINYL ETHERS
Edward Karcher Gladding, New Castle County, Del., and Raymond Sullivan, Los Angeles, Calif., assignors to E. I. du Pont de Nemours and Company, Wilmington, Del., a corporation of Delaware
No Drawing. Continuation-in-part of application Ser. No. 527,725, Feb. 16, 1966. This application Sept. 30, 1968, Ser. No. 763,953
Int. Cl. C08f *15/40*
U.S. Cl. 260—80.73      16 Claims

ABSTRACT OF THE DISCLOSURE

Copolymers are prepared from two ethylenically unsaturated comonomers and a substituted perfluorovinyl ether having the formula $CF_2=CF-O-(CF_2)_n-X$ wherein —X can be —CN, —COF, —COOH, —COOR$_1$, —COOM, or —CONR$_2$R$_3$; wherein —M is an alkali metal; R$_1$ is an alkyl radical of 1 to 10 carbons (preferably 1 to 3), and R$_2$ and R$_3$ can be R$_1$, hydrogen, or combinations thereof; and $n$ is from 2 to 12, preferably 2 to 4. Preferred comonomers are tetrafluoroethylene, hexafluoropropylene, and $CF_2=CF-O-R_f$ wherein R$_f$ is perfluoroalkyl of from 1 to 3 carbons. The substituted perfluorovinyl ether is preferably present in the amount of about 0.5 to 5 mole percent.

CROSS-REFERENCE TO RELATED APPLICATIONS

This application is a continuation-in-part of application Ser. No. 527,725, filed Feb. 16, 1966, now abandoned.

FIELD OF THE INVENTION

This invention relates to copolymers of fluorinated ethers.

BACKGROUND OF THE INVENTION

Polymers prepared from certain fluorinated monomers have become widely known for their ability to resist environmental attack. U.S. Pat. No. 3,235,537, issued Feb. 15, 1966 to Albin and Gallagher, discloses a process wherein perfluoroalkyl perfluorovinyl ethers are employed as comonomers with vinylidene fluoride and other ethylenically saturated monomers. Ether comonomers such as those disclosed by Albin et. al. do not participate in cross-linking by conventional routes which depend upon dehydrofluoroination. This is particularly disadvantageous when the copolymers are completely fluorinated (e.g., containing no vinylidene fluoride). There has now been provided in U.S. application Ser. No. 763,954, filed Sept. 30, 1968, a class of novel vinyl ethers which can be readily employed as cure-site monomers in fluorinated-type polymer systems.

BRIEF STATEMENT OF THE INVENTION

According to this invention, there are provided normally solid, random copolymers of
(a) Monomers selected from the group consisting of vinylidene fluoride, tetrafluoroethylene, hexafluoropropylene, 1,1,1,2,3-pentafluoropropylene, and $$CF_2=CF-O-R_f$$

where R$_f$ is perfluoroalkyl of from 1 to 3 carbons; and
(b) Substituted perfluorovinyl ethers having the formula $CF_2=CF-O-(CF_2)_n-X$ wherein —X can be —CN, —COF, —COOH, —COOR$_1$, —COOM, or —CONR$_2$R$_3$; and wherein —M is alkali metal; R$_1$ is an alkyl radical of 1 to 10 carbons (preferably 1 to 3) and R$_2$ and R$_3$ can be R$_1$, hydrogen, or combinations thereof; and $n$ is from 2 to 12, preferably 2 to 4.

DETAILED DESCRIPTION OF THE INVENTION

The first step in preparing the substituted perfluorovinyl ethers (b) follows the disclosure of U.S. Pat. No. 3,114,778. The preferred method involves the reaction of a perfluoro diacid fluoride [OFC—(CF$_2$)$_x$—CFO wherein $x$ is from 1 to about 11] with hexafluoropropylene oxide in the presence of an alkali metal fluoride such as CsF and a polar solvent such as diethylene glycol dimethyl ether. The products of the reaction are perfluoro [2-methyl-3-oxa-alkane] dioyl fluorides. In the next step of the process the dioyl fluorides are esterified with alcohols, preferably methanol to the diester form. The diester is then saponified with an anhydrous methanol solution of an alkali metal hydroxide, such as KOH, NaOH, or CsOH, to provide the di-monovalent salt. Alternatively, the dioyl fluoride can be converted to a diacid by reaction with water with subsequent neutralization with an aqueous solution of the aforementioned hydroxides. The preferred salt is the di-potassium salt. Pyrolysis of the di-metal salt under substantially anhydrous conditions at a temperature of at least about 175° C., but below about 200° C. and isolation of the reaction products provides the mono-metal salt of the perfluorovinyl ether. These salts can be reacted with aqueous solutions of strong acids to form the acids. The latter can be esterified with alcohols to form the esters or amidated with amines to form the amides. When the amides are formed by treatment with ammonia, subsequent reaction with P$_2$O$_5$ leads to the formation of nitriles, all containing the perfluorovinyl group. In addition, the substituted perfluorovinyl ethers of the invention where —X is —COF or —COOH can be converted to alkaline earth metal ionomers such as that of magnesium, employing conventional reaction techniques. Additional details concerning the preparation of the substituted perfluorovinyl ether comonomers are set out in copending application Ser. No. 763,954, filed Sept. 30, 1968.

Preferred classes of copolymers are terpolymers of:
(1) Vinylidene fluoride, hexafluoropropylene, and $CF_2=CF-O-(CF_2)_n-COOR_1$ where $n$ is from 2 to 12, (preferably 2 to 4) and R$_1$ is an alkyl radical of 1 to 10 carbons (preferably 1 to 3);
(2) $CF_2=CF-O-(CF_2)_n-COOR_1$ as above, tetrafluoroethylene and $CF_2=CF-O-R_f$ wherein R$_f$ is perfluoroalkyl of from 1 to 3 carbons; and
(3) $CF_2=CF-O-(CF_2)_n-CN$, tetrafluoroethylene and $CF_2=CF-O-R_f$ as above.

Preferably, the polymers of the invention contain the substituted perfluorovinyl ether in the amount of about 0.5 to 5 mole percent. In the terpolymer, the other comonomers are from 99.5 to 95 mole percent of the terpolymer, and are preferably present in roughly equal proportions, ranging relative to one another from 30/70, to 70/30, preferably about 50/50 mole percent.

In preparing copolymers containing the substituted perfluorovinyl ether comonomers, a preferred method of polymerization employs aqueous media and free-radical initiators at slightly elevated temperatures, e.g., 40° C., and pressures in the order of 120 p.s.i.g. Alternatively, bulk or solution processes can be used with appropriate free-radical catalysts. Those skilled in the art will recognize modification of polymerization conditions to suit the monomers employed, e.g., one would normally not employ aqueous systems for monomers having water-reactive end groups unless such a reaction were desired. The ester form, particularly the methyl ester, is preferred for copolymerization with other ethylenically unsaturated monomers, but any alkyl ester group containing up to about 10 carbon atoms is satisfactory, with those containing up to three carbon atoms being preferred.

The invention will now be described with reference to the following examples of specific embodiments thereof wherein parts and percentages are by weight unless otherwise indicated.

EXAMPLE 1

Preparation of copolymer of methyl perfluoro-6-oxa-7-octenoate, perfluoromethyl perfluoro - vinylether, and tetrafluoroethylene Into a 1-gallon stainless steel autoclave thoroughly flushed with nitrogen and then with gaseous perfluoromethyl perfluorovinylether is charged 246 ml. of phosphate solution (prepared by dissolving 151 g. of $$Na_2HPO_4 \cdot 7H_2O$$

and 8.6 g. $NaH_2PO_4 \cdot H_2O$ in 1930 ml. $H_2O$); 1554 ml. distilled and deaerated $H_2O$; 15 g. of commercial ammonium perfluorooctenoate (FC–126); and 2 g. of ammonium persulfate. The autoclave and contents are stirred and maintained at 40° C. and 120 p.s.i.g. pressure during the 5-hour run. Pressure is first raised to 120 p.s.i.g. by metering over a 20-minute period perfluoromethyl perfluorovinylether and tetrafluoroethylene at rates of 195 g./hr. and 83 g./hr., respectively, as gaseous monomers. Liquid methyl perfluoro-6-oxa-7-octenoate, 7.3 g., is introduced during the same period by a screw injector. Near the start of the run, 50 ml. of sulfite solution (prepared by dissolving 0.071 g. $CuSO_4 \cdot 5H_2O$ and 9 g. of $Na_2SO_3$ in 900 ml. of distilled, deaerated $H_2O$) is pumped into the autoclave and during the run 10 ml. of the sulfite solution are added each hour. The pressure is then maintained at 120 p.s.i.g. by adjusting the gas flow rates or by addition of the sulfite solution. Typically, during this period perfluoromethyl perfluorovinylether is charged at a rate of 29.4 g./hr.; tetrafluoroethylene at a rate of 28 g./hr.; and methyl perfluoro-6-oxa-7-octenoate at a rate of 3.3 g./hr. After the initial 20-minute period, 289 g. of monomer are added. After the 5-hour run, there are 14.7 l. of off gas at 25° C. and atmospheric pressure. The copolymer latex weighs 2298 g. and has a pH of 6. The solid copolymer is coagulated by freezing the latex in a "Dry-Ice"/acetone mixture, then warmed to room temperature, filtered from the liquid, washed five times with water in a blender, dried to constant weight at room temperature and on a 2-roll rubber mill at 100° C. The yield of solid polymer is 257 g. It has an inherent viscosity of 0.48 measured at 30° C. in 2,3-dichloroperfluorobutane at a concentration of 0.1 g. per 100 ml. of solvent. A thin pressed film shows the strong infrared absorption bands at 5.54 microns (characteristic of the methyl ester group) and at 11.25 microns (characteristic of the perfluoromethyl perfluorovinylether group).

EXAMPLE 2

The procedure of Example 1 is followed except that the amount of methyl perfluoro-6-oxa-7-octenoate added during the first 20 minutes is 19.3 g., the duration of the run is 5.5 hours, and the total amount of monomers added is 359 g. The yield of copolymer is 321 g., and the inherent viscosity is 0.51. The copolymer has 23% carbon and 0.35% hydrogen. Infrared absorption spectra indicate about twice the concentration of the ester group as found in Example 1.

The copolymers of Examples 1 and 2 are compounded on a 2-roll rubber mill according to the following weight proportions:

|  | A | B |
|---|---|---|
| Copolymer of Example 1 | 100 |  |
| Copolymer of Example 2 |  | 100 |
| Medium thermal carbon black | 20 | 20 |
| Magnesium oxide | 15 | 15 |
| Hexamethylene diamine carbamate | 1 | 1 |

The compositions are molded under pressure for 30 minutes at 160° C. by conventional compression molding techniques into sheets which are suitable for use in physical testing. The sheets are then removed from the mold and heated in an air oven to 240° C. over a 24-hour period, followed by heating 24 hours at 204° C. to complete the vulcanization. The sheets are tested with the following results:

|  | A | B |
|---|---|---|
| Properties measured at 25° C.: |  |  |
| Tensile strength, p.s.i. | 3,250 | 3,200 |
| Elongation at break, percent | 75 | 50 |
| Hardness, Durometer A | 88 | 94 |
| Properties measured at 100° C.: |  |  |
| Tensile strength, p.s.i. | 1,400 | 2,000 |
| Elongation at break, percent | 80 | 70 |
| Hardness, Durometer A | 85 | 90 |

The unvulcanized compounds of A and B are soluble in 2,3-dichloroperfluorobutane at room temperature. After vulcanization and immersion in this solvent at room temperature the compounds swell but do not dissolve, e.g., Compound A has a volume increase of 184% and Compound B a volume increase of 79%.

When the vulcanizates are immersed at room temperature in other solvents such as acetone, ethyl acetate, tetrahydrofuran, and dimethyl formamide, the volume increases are in the order of 0 to 50%, illustrating the excellent solvent resistance of the copolymers. When for comparison polymers are prepared according to this and the preceding example but omitting the substituted perfluorovinyl ether comonomer, the polymers cannot be vulcanized by the above process.

EXAMPLE 3

Preparation of copolymer of methyl perfluoro-5-oxa-6-heptenoate, perfluoromethyl perfluorovinylether, and tetrafluoroethylene Into a 1-gallon stainless steel autoclave is charged 346 ml. of aqueous 4% $Na_2PHO_4 \cdot 7H_2O$; 1554 ml. of deaerated $H_2O$; 4 g. of $(NH_4)_2S_2O_3$; 15 g. of commercial ammonium perfluorooctanoate and 4 g. of methyl perfluoro-5-oxa-6-heptenoate. The vessel and contents are heated to 40° C., stirring is continuous, and pressure is maintained at 120 p.s.i.g. during the run. Pressure is initially built up by introducing 27.5 g. of tetrafluoroethylene and 65.1 g. of perfluoromethyl perfluorovinylether. Also introduced into the autoclave is 50 ml. of a catalyst solution made up of 720 ml. of distilled deaerated $H_2O$, 180 ml. of aqueous 0.01% $CuSO_4$ solution, and 18 g. of $Na_2SO_3$. Every 15 minutes thereafter 5 ml. of the catalyst solution is added during the two hours duration of the run. Additional tetrafluoroethylene is introduced at a rate of 43.9 g./hr., and additional perfluoromethyl perfluorovinylether is introduced at a rate of 48.2 g./hr. After the run there are 16.4 l. of off-gas at 25° C. and atmospheric pressure. The copolymer latex is frozen in "Dry-Ice"/acetone to coagulate the solid polymer. This is warmed to room temperature, filtered, washed with $H_2O$ and dried at room temperature to give 150 g. of solid product. A film of the polymer shows the strong infrared absorption bands at 5.53 microns which are characteristic of the methyl ester group.

EXAMPLE 4

Preparation of copolymer of methyl perfluoro-6-oxa-7-octenoate, vinylidene fluoride and hexafluoropropene A 1.4 liter stainless steel autoclave is conditioned with a 1% solution of ammonium persulfate, prepared with deoxygenated distilled water, by stirring the solution in it for about 3 hours at 80° C. The solution is drained under a nitrogen blanket and the autoclave is cooled to room temperature. The following catalyst solution is introduced:

400 ml. deoxygenated distilled $H_2O$,
21 ml. 1% $AgNO_3$ solution,
1.8 g. $Na_2HPO_4 \cdot 7H_2O$,
1.8 g. $Na_3PO_4 \cdot 12H_2O$,
0.64 g. commercial ammonium perfluorooctanoate, and
0.35 g. ammonium persulfate.

Four grams of methyl perfluoro-6-oxa-7-octenoate are introduced by means of a syringe.

Hexafluoropropene (85 g.) is then pressured into the autoclave under a nitrogen blanket. The temperature is raised to 50° C., and vinylidene fluoride is added until a pressure of 350 p.s.i.g. is reached. The autoclave and contents are agitated intermittently, and additional vinylidene fluoride is introduced to maintain pressure. During a 3-hour period, 35 g. of this monomer are introduced. Agitation is stopped, the temperature is lowered to room temperature, and the autoclave is vented to atmospheric pressure. The latex recovered from the autoclave is frozen to coagulate the polymer. This is washed with $H_2O$ several times in a blender and dried in a vacuum oven to constant weight (49.9 g.). The polymer has an inherent viscosity of 2.45 measured at 30° C. at a concentration of 1 g. per 100 ml. of 2,3-dichloroperfluorobutane. The infrared spectrum shows absorptions at 1785 cm.$^{-1}$ and 1690 cm.$^{-1}$. The 1785 cm.$^{-1}$ absorption is characteristic of the ester group.

A copolymer is prepared in similar manner, but without the methyl perfluoro-6-oxa-7-octenoate monomer, does not show these absorptions.

EXAMPLE 5

Preparation of copolymer of perfluoro-6-oxa-7-octenoyl fluoride, perfluoromethyl perfluorovinylether, and tetrafluoroethylene One hundred ml. of FC-75 (3M brand perfluorinated cyclic ethers principally isomers of $C_8F_{16}O$) is introduced under nitrogen into a heavy walled pressure vessel. The reactor is chilled, lightly evacuated, and 24 g. of tetrafluoroethylene, 60 g. perfluoro(methyl vinyl ether), 1 g. of $CF_2=CFO(CF_2)_4COF$ and 15 milligrams of $N_2F_2$ introduced. The vessel is closed, heated for 6 hours at 60° C. and cooled to room temperature. Unreacted gases are vented, and approximately 20 g. of a somewhat rubbery polymer is isolated. An infrared spectrum of a film pressed from the polymer shows an absorption peak appropriate for an acid fluoride group (5.3$\mu$). Such absorption is not present in the spectrum of a polymer prepared from tetrafluoroethylene and perfluoro(methyl vinyl ether) alone.

Exposure of the polymer to moist air results in a change in the infrared spectrum which indicates the formation of carboxylic acid groups from part of the original —COF groups.

Exposure of the polymer to ultraviolet light at about 200° C. considerably reduces the amount it will swell in a mixture of FC-75 and trifluoroacetic acid.

When the polymer is treated with methanol, the —COF groups are converted to —COOCH$_3$ groups as indicated by the appearance of strong absorption at 5.6$\mu$ in the infrared spectrum.

EXAMPLE 6

Preparation of copolymer of perfluoro-5-oxa-6-heptenenitrile, perfluoromethyl perfluorovinylether and tetrafluoroethylene A silver-lined pressure bomb is charged with the following:

28 g. perfluoromethyl perfluorovinylether,
8 g. tetrafluoroethylene,
0.8 g. perfluoro-5-oxa-6-heptenenitrile,
10 milligrams of $N_2F_2$, and
50 ml. or distilled F-113 (Du Pont's "Freon"-113 or 1,2,2-trichlorotrifluoroethane).

After heating of the bomb for 5 hr. at 60° C., venting of the gases and evaporation of the solvent gives 5.9 g. of polymer. An infrared spectrum indicates it to contain $CF_2=CFO(CF_2)_3CN$ and 30% perfluoromethyl perfluorovinyl ether. The former compound is adjudged to be present because the polymer contains an absorption of 10.3$\mu$, an absorption also present in the spectrum of the nitrile monomer. The weak nitrile absorption at 4.4$\mu$ is hidden under a strong absorption of 4.25$\mu$.

EXAMPLE 7

Preparation of copolymers of perfluoro-6-oxa-7-octenenitrile, perfluoromethyl perfluorovinylether, and tetrafluoroethylene (A) A Hastelloy-lined pressure bomb is charged with the following:

a solution in 100 ml. water of 1.0 g. FC-126 (3M's ammonium perfluoro octenoate),
0.95 g. $K_2S_2O_8$,
1.3 g. $NaH_2PO_4 \cdot H_2O$,
0.2 g. $Na_2SO_3$,
1.0 ml. of 0.01% Cu$^{++}$ solution
36 g. perfluoromethyl perfluorovinylether,
17 g. tetrafluoroethylene, and
3.0 g. perfluoro-6-oxa-7-octenenitrile.

After heating the bomb with shaking for 8 hours at 50° C., the bomb is cooled and gases vented. Polymer from the remaining latex is precipitated by freezing. After washing several times with distilled water and drying at 100° C./20 min. for 16 hrs., a total of 24 g. of polymer is obtained. Infrared spectroscopy indicates that the polymer contains both perfluoromethyl perfluorovinylether (absorption at 11.25$\mu$) and the nitrile comonomer (absorption at 4.4, 9.95 and 10.68$\mu$).

(B) The perfluoro - 6-oxa-7-octenenitrile/tetrafluoroethylene/perfluoromethyl perfluorovinylether copolymer can also be prepared according to the following procedure. A one gallon autoclave is charged with an aqueous solution containing the following:

1870 ml. distilled water,
15 g. FC-126,
4.9 g. $Na_2HPO_4 \cdot 7H_2O$,
3.6 g. $NaH_2PO_4 \cdot H_2O$, and
2.0 g. $(NH_4)_2S_2O_8$.

The autoclave is closed and purged with nitrogen, then heated to 45° C. and pressured to 160 p.s.i. with a 50:50 mole percent mixture of perfluoromethyl perfluorovinylether and tetrafluoroethylene. 30 milliliters of a catalyst solution containing the following are then added: 180 ml. of 0.01% Cu$^{++}$ solution in water, 9.0 g. $Na_2SO_3$, and 720 ml. distilled water. Following this addition, the pressure is maintained by feeding a 60/40 mole percent perfluoromethyl perfluorovinylether/tetrafluoroethylene gas mixture. Catalyst solution is added at the rate of 5 ml./30 min. The $CF_2=CFO(CF_2)_4CN$ monomer is added as a 2:1 F-113:nitrile solution at a rate of 1 mole percent per 100 mol percent of the total perfluoromethyl perfluorovinylether and tetrafluoroethylene comonomer being fed. After about 6 hrs., additions are stopped, the autoclave cooled, gases vented, and the latex removed. 320 grams of polymer is recovered from the latex by precipitation of a 1:1 volume mixture of latex-ethanol with saturated $MgCl_2$ solution. The polymer is washed several times with a 1:1 volume mixture of water and ethanol, then dried. An infrared spectrum indicates it to contain 38% perfluoromethyl perfluorovinylether and shows a nitrile absorption at 4.43$\mu$.

(C) Vulcanization of the perfluoro-6-oxa-7-octenenitrile copolymers. Copolymers prepared as in parts A and B of this example are compounded on a 2-roll rubber mill according to the following weight proportions:

|  | C | D |
|---|---|---|
| Copolymer of part A | 100 |  |
| Copolymer of part B |  | 100 |
| Medium thermal carbon black | 11.1 | 10 |
| Silver oxide | 4.8 |  |
| Sn(C₆H₅)₄ |  | 6 |

Compound C is cured by pressing at 180° C. for 30 min. by the conventional compression molding technique into a slab suitable for physical testing. Compound D is similarly formed into a slab by pressing at 160° C. for approximately 18 hours. The latter slab is then postcured at 204° C. for approximately 28 hours (including a 4 hr. cam to temperature). The slabs from Compounds C and D are tested at 25° C. with the following results:

|  | C | D |
|---|---|---|
| Modulus at 100% extension (p.s.i.) | 780 | 760 |
| Tensile strength at break (p.s.i.) | 1,600 | 1,900 |
| Elongation at break (percent) | 200 | 160 |
| Permanent set at break (percent) | 6 | 2 |

The unvulcanized compounds of C and D are soluble at room temperature in a solution of Hydrocarbon 428 (the Halocarbon Products Corporation's dichloro-octafluorobutane) containing 0.5% by weight methanol. After vulcanization the compounds do not dissolve upon immersion in this solvent, indicating the excellent solvent resistance of the copolymers.

The novel copolymers of the invention are vulcanizable and can be shaped and molded into a wide variety of useful products according to methods well known in the art. As is apparent from the examples set out above, the copolymers have desirable tensile properties in addition to their ability to resist environmental attack. In addition to the comonomers specified above, the substituted perfluorovinylethers can be copolymerized with a variety of ethylenically unsaturated monomers such as alpha-olefins, vinyl ethers, vinyl halides, and the like.

As many widely different embodiments of this invention may be made without departing from the spirit and scope thereof, it is to be understood that this invention is not limited to the specific embodiments thereof except as defined in the appended claims, and all changes which come within the meaning and range of equilvalence are intended to be embraced therein.

What is claimed is:

1. Normally solid random terpolymers consisting essentially of (1) from 99.5 to 95 mole percent of two monomers wherein one monomer is:
   (a) from 30 to 70 mole percent of a monomer selected from the group consisting of vinylidene fluoride, tetrafluoroethylene, hexafluoropropylene, chlorotrifluoroethylene, 1,1,1,3,3-pentafluoropropylene, 1,1,1,2,3-pentafluoropropylene, and CF₂=CF—O—R$_f$ where R$_f$ is perfluoroalkyl of from 1 to 3 carbons; and the other monomer is
   (b) from 70 to 30 mole percent of a monomer, selected from the group consisting of vinylidene fluoride, tetrafluoroethylene, hexafluoropropylene, chlorotrifluoroethylene, 1,1,1,3,3-pentafluoropropylene, 1,1,1,2,3 - pentafluoropropylene, and CF₂=CF—O—R$_f$ where R$_f$ is perfluoroalkyl of from 1 to 3 carbons; wherein (a) and (b) are different monomers, and
(2) from 0.5 to 5 mole percent of $$CF_2=CF—O—(CF_2)_n—X$$

wherein —X is —CN, —COF, —COOH, —COOR₁, —COOM, or CONR₂R₃; wherein —M is alkali metal; R₁ is an alkyl radical of from 1 to 10 carbons and R₂ and R₃ are R₁ hydrogen, or combinations thereof; and n is a whole number from 2 to 12.

2. Terpolymers according to claim 1 wherein —X is —COOR₁, n is a whole number of from 2 to 4, and R₁ is an alkyl radical of from 1 to 3 carbons.

3. Terpolymers according to claim 1 wherein —X is —COOH and n is a whole number from 2 to 4.

4. Terpolymers according to claim 1 wherein —X is —COOM, n is a whole number from 2 to 4, and wherein the said alkali metal is Na, K or Cs.

5. Terpolymers according to claim 1 wherein —X is —CON(C₂H₅)₂ and n is a whole number from 2 to 4.

6. Terpolymers according to claim 1 wherein —X is —CN and n is a whole number from 2 to 4.

7. Terpolymers according to claim 1 wherein —X is —COF and n is a whole number from 2 to 4.

8. A trepolymer according to claim 1 wherein the selected monomers (a) and (b) are vinylidene fluoride and hexafluoropropene, and wherein —X is —COOR₁, wherein R₁ is an alkyl radical of from 1 to 3 carbons.

9. A terpolymer according to claim 8 wherein R₁ is methyl and n is a whole number from 2 to 4.

10. A terpolymer according to claim 1 wherein the selected monomers (a) and (b) are tetrafluoroethylene and CF₂=CF—O—R$_f$ and wherein —X is —COOR₁ where R₁ is an alkyl radical of from 1 to 3 carbons.

11. A terpolymer according to claim 1 wherein the selected monomers (a) and (b) are tetrafluoroethylene and CF₂=CF—O—R$_f$; and wherein —X is —CN.

12. A terpolymer according to claim 11 wherein n is a whole number from 2 to 4.

13. A vulcanizate of the polymer of claim 1.
14. A vulcanizate of the polymer of claim 9.
15. A vulcanizate of the polymer of claim 10.
16. A vulcanizate of the polymer of claim 12.

References Cited

UNITED STATES PATENTS

| 2,713,593 | 7/1955 | Brice et al. |  |
| 3,114,778 | 12/1963 | Fritz et al. |  |
| 3,235,537 | 2/1966 | Albin et al. |  |
| 3,318,854 | 5/1967 | Honn et al. | 260—87.7 |

JOSEPH L. SCHOFER, Primary Examiner

S. M. LEVIN, Assistant Examiner

U.S. Cl. X.R.

260—41, 80.3, 80.76, 80.77, 87.5, 87.7, 88.1